United States Patent
Laakso (10) Patent No.: US 11,009,215 B2
(45) Date of Patent: May 18, 2021

(54) ILLUMINATOR HAVING A PLURALITY OF LIGHT EMITTING ELEMENTS AND CYLINDRICAL LENS

(71) Applicant: Obelux Oy, Helsinki (FI)

(72) Inventor: Vesa Laakso, Helsinki (FI)

(73) Assignee: Obelux Oy, Helsinki (FI)

(*) Notice: Subject to any disclaimer, the term of this patent is extended or adjusted under 35 U.S.C. 154(b) by 0 days.

(21) Appl. No.: 16/601,612

(22) Filed: Oct. 15, 2019

(65) Prior Publication Data
US 2020/0116330 A1    Apr. 16, 2020

(30) Foreign Application Priority Data

Oct. 15, 2018 (FI) ...................................... 20185869

(51) Int. Cl.
| | |
|---|---|
| *G03B 3/06* | (2021.01) |
| *F21V 5/04* | (2006.01) |
| *F21S 8/08* | (2006.01) |
| *F21V 3/02* | (2006.01) |
| *F21W 131/107* | (2006.01) |

(52) U.S. Cl.
CPC .............. *F21V 5/043* (2013.01); *F21S 8/085* (2013.01); *F21V 3/02* (2013.01); *F21V 5/045* (2013.01); *F21W 2131/107* (2013.01)

(58) Field of Classification Search
CPC . F21V 3/02; F21V 5/046; F21V 5/048; F21V 5/08; G02B 3/02; G02B 3/04; G02B 3/06
See application file for complete search history.

(56) References Cited

U.S. PATENT DOCUMENTS

| | | | | |
|---|---|---|---|---|
| 7,033,061 | B1* | 4/2006 | Wu ............................ | F21V 5/00 359/599 |
| 7,422,347 | B2* | 9/2008 | Miyairi .................... | G09F 13/22 362/335 |
| 8,052,307 | B2* | 11/2011 | Bak ........................... | F21V 5/04 362/257 |
| 8,331,037 | B2* | 12/2012 | Lu ............................. | F21V 5/04 359/721 |
| 8,506,122 | B2* | 8/2013 | Bak ........................... | F21V 5/04 362/257 |
| 8,823,048 | B2* | 9/2014 | Lee ..................... | G02B 19/0071 257/102 |
| 9,175,832 | B2* | 11/2015 | Sy ............................ | F21V 13/04 |
| 9,255,686 | B2* | 2/2016 | Wilcox ................... | F21V 5/008 |
| 9,557,033 | B2* | 1/2017 | Jacobson ................ | F21V 5/007 |
| 9,683,715 | B2* | 6/2017 | Min .................... | G02B 19/0071 |
| 2008/0297020 | A1* | 12/2008 | Wanninger ......... | G02B 27/0927 313/110 |

(Continued)

FOREIGN PATENT DOCUMENTS

| | | |
|---|---|---|
| CN | 101684920 B | 12/2011 |
| EP | 1927808 A1 | 6/2008 |

(Continued)

*Primary Examiner* — Ismael Negron
(74) *Attorney, Agent, or Firm* — Laine IP Oy (57) ABSTRACT

An illuminator including a plurality of light emitting elements and a lens having a concave cylindrical first optical surface and a second optical surface, such that a thickness between the first and second optical surfaces is non-uniform along first and second orthogonal directions.

14 Claims, 10 Drawing Sheets

(56) References Cited

U.S. PATENT DOCUMENTS

| | | | |
|---|---|---|---|
| 2011/0228528 A1* | 9/2011 | Yang | F21K 9/27 362/235 |
| 2013/0120991 A1* | 5/2013 | Wohlgemuth | F21S 8/08 362/246 |
| 2014/0254189 A1 | 9/2014 | Stein et al. | |
| 2018/0245764 A1 | 8/2018 | Jha et al. | |

FOREIGN PATENT DOCUMENTS

| | | |
|---|---|---|
| EP | 2541134 A2 | 1/2013 |
| JP | 2003204083 A | 7/2003 |
| JP | 2011204445 A | 10/2011 |
| JP | 2014154542 A | 8/2014 |
| JP | 2017073388 A | 4/2017 |
| JP | 2017091714 A | 5/2017 |
| WO | WO2017041624 A1 | 3/2017 |
| WO | WO2018073196 A1 | 4/2018 |

* cited by examiner

ILLUMINATOR HAVING A PLURALITY OF LIGHT EMITTING ELEMENTS AND CYLINDRICAL LENS

FIELD

The present invention relates to illumination. In particular, the present invention relates to forming a particular lighting pattern with illuminated markers, specifically fixed illuminators for indicating the presence of a flight obstacle or for aiding navigation.

BACKGROUND

Flight obstruction illuminators or "lights" are lighting apparatuses attached to high buildings or the like for preventing aircraft from colliding with the structures. The lights increase the visibility of high structures and they are mainly used in the night time, but they are also used during the day, if necessary. Typically the lights are continuously-lit or blinking red lights or white blinking lights. The type, application, lighting, method, intensity and several other aspects are determined by national and international air traffic regulations, such as those by ICAO and FAA.

The advantages of LED lighting are long service intervals, good reliability and long service life. Thus they are especially well suited for use in places with difficult access either due to structural reasons or long distances.

The light beams of flight obstruction lights are constructed to meet the requirements of very precise regulations. Such requirements include, among others, the light power and the width of the beam. In a horizontally omnidirectional light the intensity of the light beam should be as even as possible along the whole circle lit by the light beam. In LED lights the widely emitted light of the light source is controlled by means of lenses. For example, a beam with a vertical extension of three degrees and having a good efficiency requires a large lens. The horizontal light distribution of e.g. a fresnel lens is about 120 degress.

Because the intensity of the light emitted from the lens is reduced towards the edges of the light, an area having a lower intensity is formed between two lenses. In order to produce an even light beam ring along the circumference of the circle, a number of lenses, such as eight lenses with 45 degree distances, have been installed on a circumference, whereby their light beams partly overlap. This allows producing a good and consistent omnidirectional ring of light, but the lenses form a large circle. Simultaneously the cost effectiveness, weight and ease of handling during installation are decreased.

An advanced obstruction illuminator is disclosed in EP 2541134 A2 featuring several Fresnel lenses arranged on different supplementary angles.

There remains, however, a long standing need to achieve a simplified illuminator construction for achieving a good horizontal coverage of, for example, 120 degrees.

SUMMARY

It is herein proposed a novel illuminator, e.g. an obstruction illuminator or an aviation illuminator. The illuminator features an artificial light source with a plurality of light emitting elements and a lens covering them. The lens has an optical portion which has a first optical surface and a second optical surface that define a thickness there between. The lens has a length in a first Cartesian dimension, a height in a second Cartesian dimension, and a depth in a third Cartesian dimension. The thickness of the optical portion is non-uniform along the first Cartesian dimension and along the third Cartesian dimension. The first optical surface is concave, when viewed in the second dimension from the point of view of the at least one artificial light source. The first optical surface is cylindrical with the cylinder axis extending in the third dimension.

According to another aspect, an omnidirectional illuminating system is proposed, wherein three such illuminators are arranged at supplementing angles in respect to each other such that angular coverage of the light output of the illuminators covers 360 degrees in one dimension, such as the horizontal.

The novel lens geometry provides considerable benefits. The lens design enables an illuminator to be constructed as a planar device that is able to produce an output light pattern with a horizontal coverage of 120 degrees. Accordingly, an omnidirectional illuminating system may be constructed from three such illuminators arranged in a triangle. The ability to install light emitting elements and lenses on a planar device as opposed to a multifaceted device considerably simplifies the design and manufacturing.

BRIEF DESCRIPTION OF THE DRAWINGS

In the following certain exemplary embodiments are discussed in greater detail with reference to the accompanying drawings in which.

EMBODIMENTS

Figure 1:
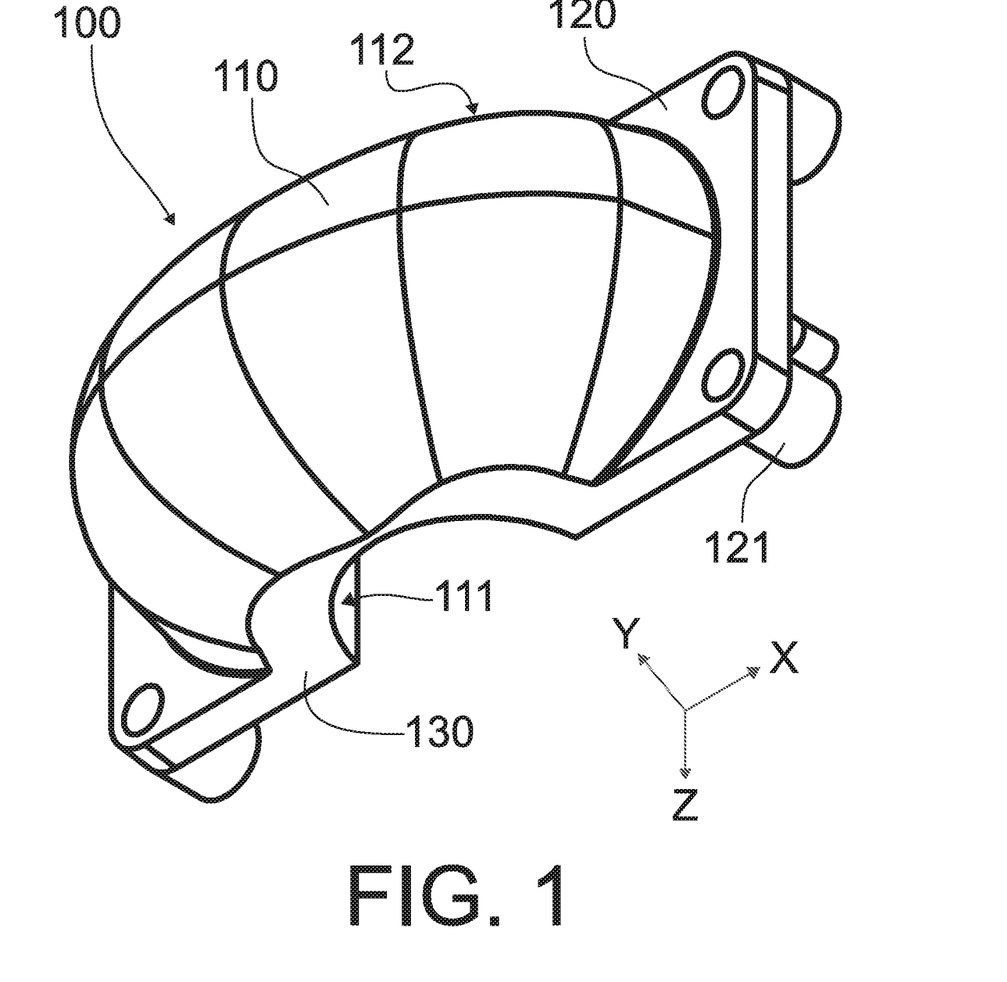
FIG. 1 illustrates a perspective view of a lens in accordance with at least some embodiments.

FIG. 1 shows an exemplary lens 100 in a perspective view with three Cartesian dimensions X, Y, and Z shown for establishing a frame of reference which is to be used throughout this description. The lens 100 has two major portions, firstly an optical portion 110 for modifying and controlling the passage of light through the lens 100 and secondly a mounting portion 120 for mounting the lens 100 to an illuminator (omitted from FIGS. 1 to 6) and over a light source (omitted from FIG. 1). The mounting portion 120 has a flange or other suitable shape which is suited to precisely affixing the lens 100 to the illuminator. A planar mounting portion 120 is preferred because the planar shape ensures correct attitude of the lens 100. The mounting portion 120 may include mounting points, such as feet 121 shown in the FIGURES, simple through holes, or marked points for indicating drilling locations, etc. The two portions 110, 120 are exemplarily manufactured as integral parts by injection molding, for example. The optical portion 110 and the mounting portion 120 connect and morph to each other through a side surface 130 on the side of the lens 100 and at the extreme of the optical portion 120. In this context, the optical portion is the part of the lens 100 that produces the visible light pattern when the lens 100 is used in its appropriate setting, i.e. mounted to an illuminator.

It may be seen from FIG. 1 that the optical portion 110 is elongated in the first dimension X, relatively flat in the second dimension Y, and relatively narrow in and curved around the third dimension Z. Generally speaking the shape of the optical portion 110 is semi-toroidal. When viewed in the third dimension Z, the optical portion 110 exhibits a generally annular shape that does not form a complete circle or other non-circular closed profile. In particular, the optical portion 110 is penannular when viewed in the third Cartesian dimension Z, i.e. in side elevation. It is to be noticed that the term semi-toroidal may be understood in a non-rigidly mathematical meaning but as a characterization of a shape that curved in one dimension and rounded in another. For example, the second optical surface 112 may not exhibit a perfect circle when viewed in the third dimension Z. Instead, and as shall transpire here after, the second optical surface 112 is curved with a non-uniform radius.

Figure 2:
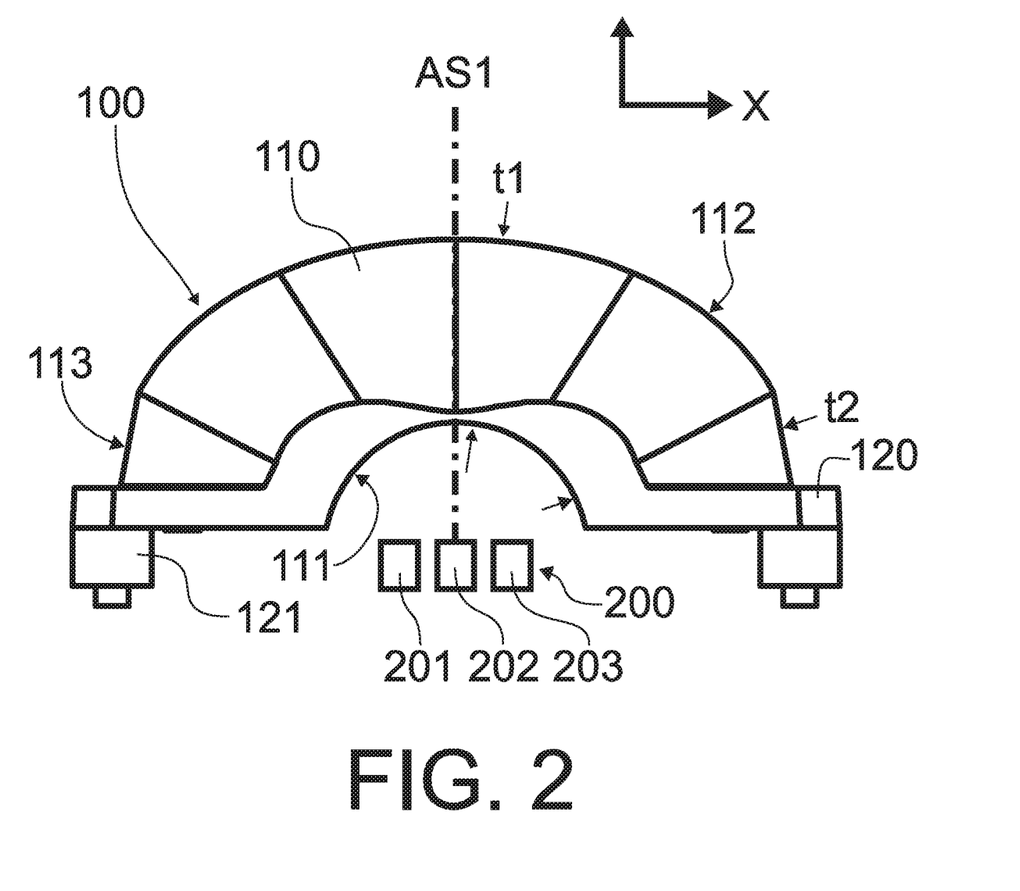
FIG. 2 illustrates a first side elevation view of the lens of FIG. 1 showing the greater extension of the lens.

FIG. 2 shows the lens 100 in a side elevation view along the third dimension Z. The horizontal of FIG. 2 is aligned with the first dimension X with the vertical aligned with the second dimension Y, whereby the third dimension Z extends up from the shown plane X, Y. In other words the plane view X, Y reveals the largest extension of the optical portion 110. FIG. 2 also demonstrates how the optical portion 110 is curved around the third dimension Z. The length of the optical portion 110 is shown as an extension in the first dimension X and the height in the second dimension Y. The width of the optical portion 110 is not expressed in FIG. 2 but may observed in FIGS. 1, 3, and 4 which show the third dimension Z.

An artificial light source 200 is sketched in FIG. 2. The light source 200 may be an LED or a plurality of LEDs arranged in a formation, such as a queue extending in the first dimension X. In the example of FIG. 2, the light source 200 has three light emitting elements 201, 202, 203, e.g. LEDs, arranged successively in the first dimension X. In other words, the light emitting elements 201-203 are spread along the greatest extension of the optical portion 110. The light emitting elements 201-203 are exemplarily arranged in the same plane. The light source 200 has a main emission direction which in the shown example extends in the second dimension Y, i.e. vertically in the illustration. The main emission direction forms a zero angle which acts as a point of reference to the light pattern produced. The light source 200 and the lens 100 form an illuminating unit which may form part of a larger illuminator.

The light source 200 is placed under a first optical surface 111 which in this context is referred to as the optical inlet surface for emphasizing the point of entry of the light emitted by the light source 200. The optical portion 110 has a thickness defined by the distance between the optical inlet surface 111 and a second surface 112. More specifically, the thickness is observed along a line drawn between a focal point of the optical inlet surface 111 and the second optical surface 112, when viewed in the third dimension Z. The second optical surface 112 is in this context referred as the optical outlet surface for emphasizing the point of exit of the light emitted by the light source 200. In respect to the light source 200 the optical inlet surface 111 is the inner surface of the lens 100 and the optical outlet surface 112 is the outer surface of the lens 100.

FIG. 2 shows that the optical portion 110 of the lens 100 has a first axis of symmetry AS1 extending in the second dimension Y at the center point of the optical portion 110 along the extension in the first dimension X. While the complete lens 100 could share the first axis of symmetry AS1, such symmetry is not required. In fact, the mounting portion 120 may be non-symmetrical by including, for example, one chamfered corner and three rounded corners (FIG. 4) for orienting the lens 100. The first axis of symmetry AS1 is exemplarily aligned with the zero angle of the light source 200 or a focal point of the optical inlet surface 111.

The optical inlet surface 111 is concave when viewed below in the second dimension Y or from the point of view of the light source 200. As shown in FIG. 2, the optical inlet surface 111 may be arranged in a curved shape around the light source 200. More particularly, the optical inlet surface 111 is curved around the third dimension Z. It is possible that the light source is placed in the focal point of the optical inlet surface 111. It should be pointed out that the entire lens 100 may not comprise a single focal point. Rather, there may be several efficient points for the light emitting elements to emit light to produce the light pattern. If, as illustrated in the FIGURES, the optical inlet surface 111 has several focal points along a shape, such as a line, it is possible that the plurality emitting elements of the light source are positioned along that shape. Accordingly, the optical inlet surface 111 may be cylindrical. The cylindrical shape may have its axis aligned with the light source 200, particularly with the focal point of the light source. The axis of the cylindrical shape extends in the third dimension Z.

The lens 100 has a variable or non-uniform thickness. In view of FIG. 2, one way of observing the variable thickness is to study the thickness across the optical portion 110 as a function of angular deviation from the zero line or the first axis of symmetry AS1. Near the first axis of symmetry AS1 the optical portion 110 has a thickness t1. As the angle between the first axis of symmetry AS1 and a line connecting the optical outlet surface 112 and the focal point of the optical inlet surface 111 increases about the third dimension Z or focal point of the optical inlet surface 111, the thickness of the optical portion 110 increases. Farther from the first axis of symmetry AS1 the optical portion 110 has a thickness t2 which is greater than the thickness t1 nearer the zero line or the first axis of symmetry AS1. It may be stated that the thickness of the extension of the optical portion 110 in the first dimension X varies. It may alternatively be stated that the thickness of the extension of the optical portion 110 in the first dimension X reaches its maximum at the extreme points in the first dimension X and minimum between the extreme points in the first dimension X, such in the middle. It may alternatively be stated that the thickness of the extension of the optical portion 110 in the first dimension X increases from the zero angle or first axis of symmetry AS1 towards the plane defined by the first and third dimension X, Z. In other words the second optical surface 112 is curved with a non-uniform radius.

Because the optical portion 110 is thicker at the ends and slimmer in the middle of the extension in the first dimension X, a ray of light originating from the light source 200 and passing through the optical portion 110 travels a longer distance at an end of the optical portion 110 than at the middle of the optical portion 110.

Figure 3:
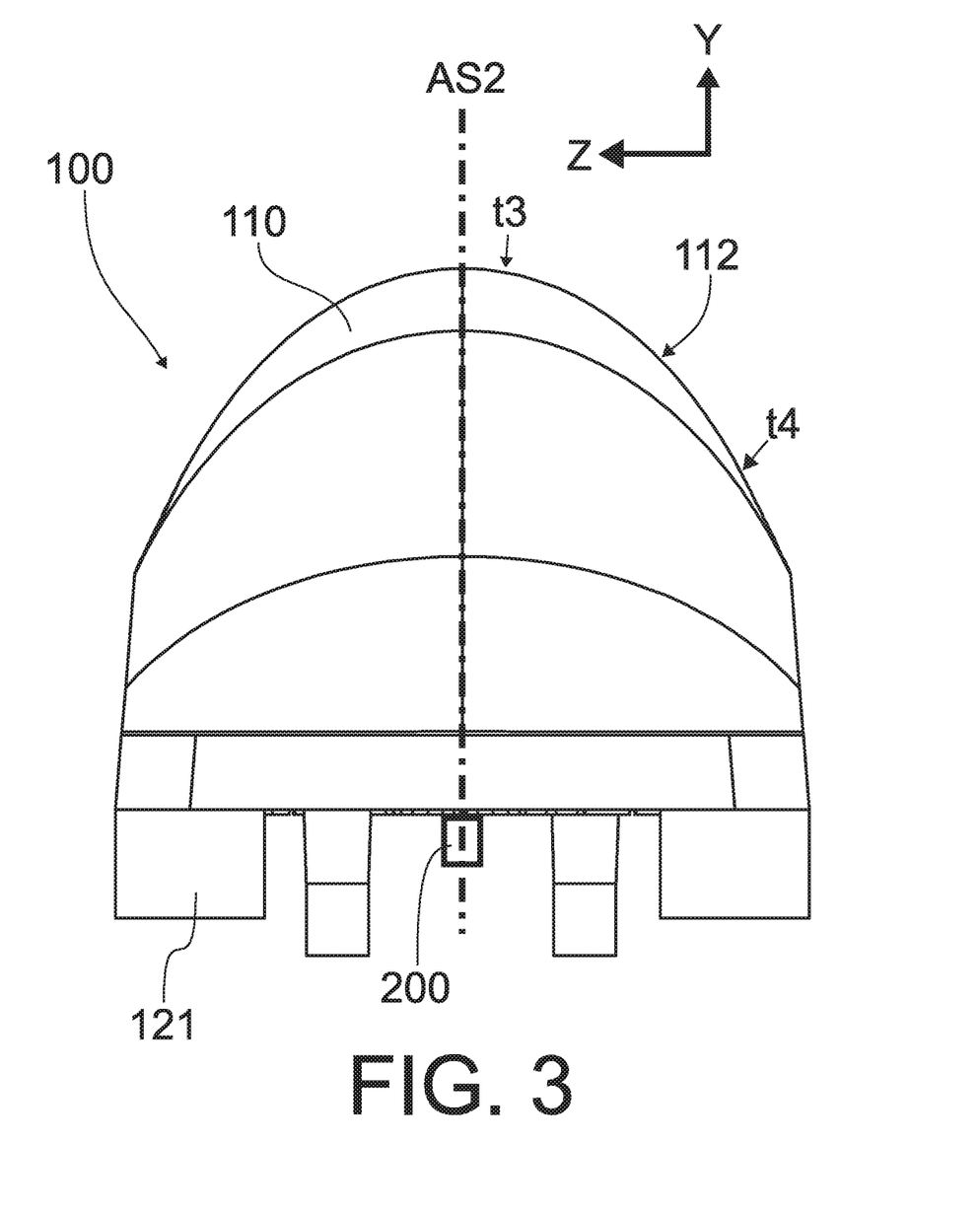
FIG. 3 illustrates a second side elevation view of the lens of FIG. 1 showing the smaller extension of the lens.

Let us turn now to FIG. 3 which shows a side elevation view of the lens 100 in the first dimension X. FIG. 3 shows that the optical portion 110 of the lens 100 has a second axis of symmetry AS2 extending in the second dimension Y at the center point of the optical portion 110 along the extension in the third dimension Z. The second axis of symmetry AS2 is aligned with the zero angle of the light source 200 or a focal point of the optical inlet surface.

The lens 100 has a variable or non-uniform thickness in the third dimension Z. In view of FIG. 3, one way of observing the variable thickness is to study the thickness across the optical portion 110 as a function of angular deviation from the zero line or the second axis of symmetry AS2 which are aligned and therefore herein used interchangeably. Near the second axis of symmetry AS2 the optical portion 110 has a thickness t3. As the angle between the second axis of symmetry AS2 and a line connecting the optical outlet surface 112 and the focal point of the optical inlet surface 111 increases about the first dimension X or focal point of the optical inlet surface 111, the thickness of the optical portion 110 decreases. Farther from the first axis of symmetry AS1 the optical portion 110 has a thickness t4 which is smaller than the thickness t3 nearer the zero line or the first axis of symmetry AS1. It may be stated that the thickness of the extension of the optical portion 110 in the third dimension Z varies. It may alternatively be stated that the thickness of the extension of the optical portion 110 in the third dimension Z reaches its minimum at the extreme points in the third dimension Z and maximum between the extreme points in the third dimension Z, such in the middle. It may alternatively be stated that the thickness of the extension of the optical portion 110 in the first dimension X decreases from the zero angle or second axis of symmetry AS2 towards the plane defined by the first and third dimension X, Z.

Figure 4:
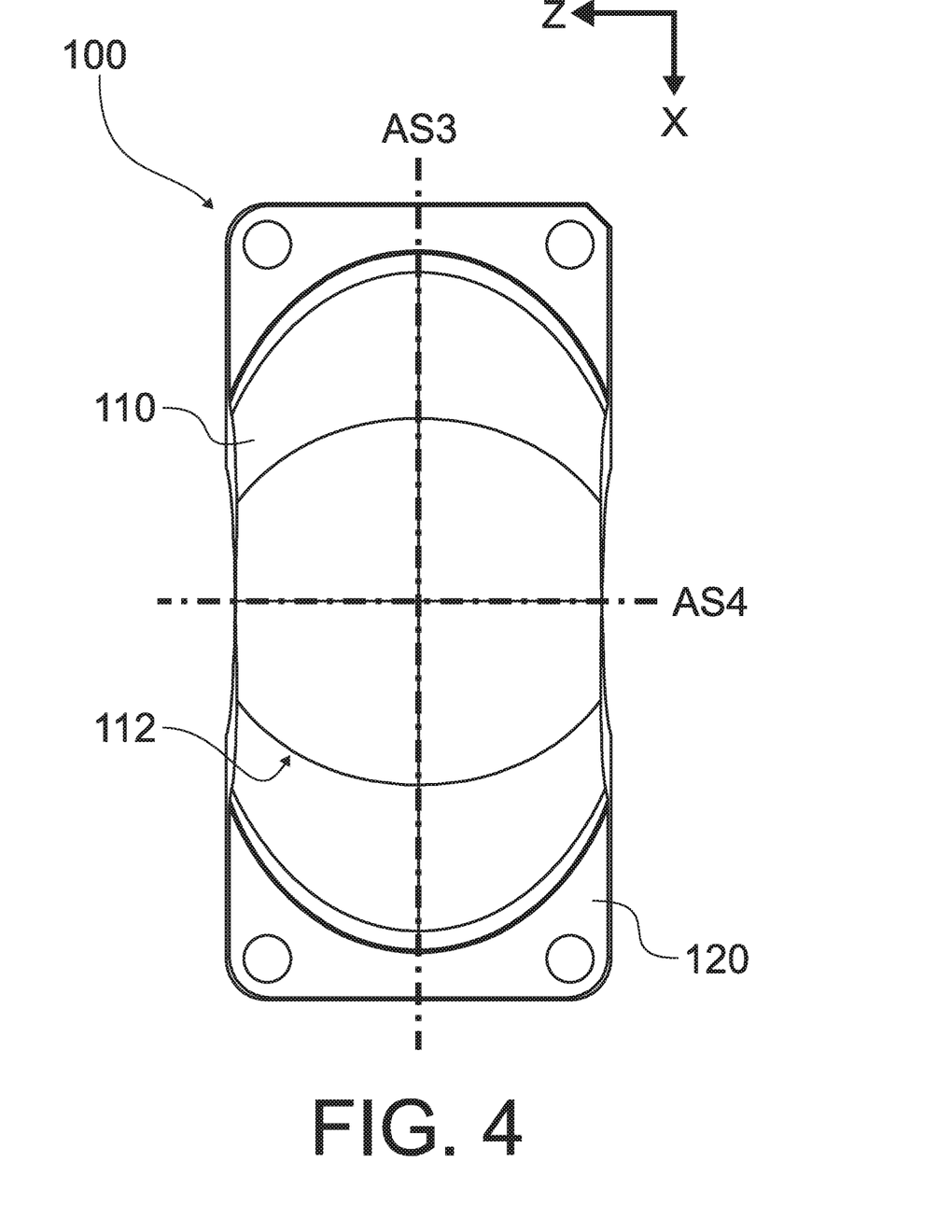
FIG. 4 illustrates a top elevation view of the lens of FIG. 1.

FIG. 4 shows the lens 100 in top elevation view along the second dimension Y which extends up from the shown plane formed by the first and third dimension X, Z. FIG. 4 shows the third axis of symmetry AS3 of the optical portion 110. The third axis of symmetry AS3 extends along the first dimension X in the middle of the optical portion 110 along the third dimension Z.

FIG. 4 also shows the fourth axis of symmetry AS4 of the optical portion 110. The fourth axis of symmetry AS4 extends along the third dimension Z in the middle of the optical portion 110 along the first dimension X.

Figure 5:
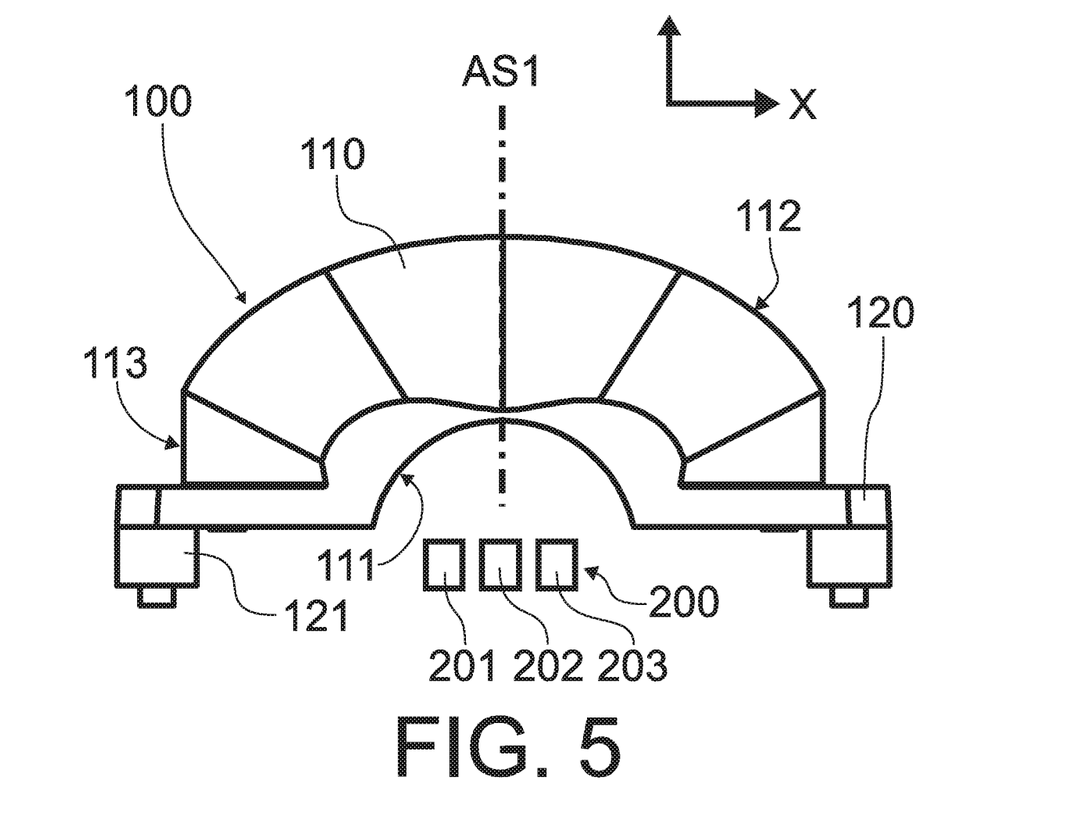
FIG. 5 illustrates a side elevation view of a modified lens in accordance with at least some embodiments featuring less draft than in the embodiment of FIG. 1.

FIG. 5 shows a side elevation view of a modified version of the lens 100 shown in FIG. 2. As may be seen, the periphery 113 of the optical outlet surface 112 exhibits less draft than the embodiment of FIG. 2. Periphery in this context refers to the zone of the optical outlet surface at the transfer between the optical portion 110 and the mounting portion 120. The embodiment of FIG. 2 exhibits a positive draft of 11 degrees in respect to the second dimension Y. The embodiment of FIG. 5 exhibits zero draft in respect to the second dimension Y.

Figure 6:
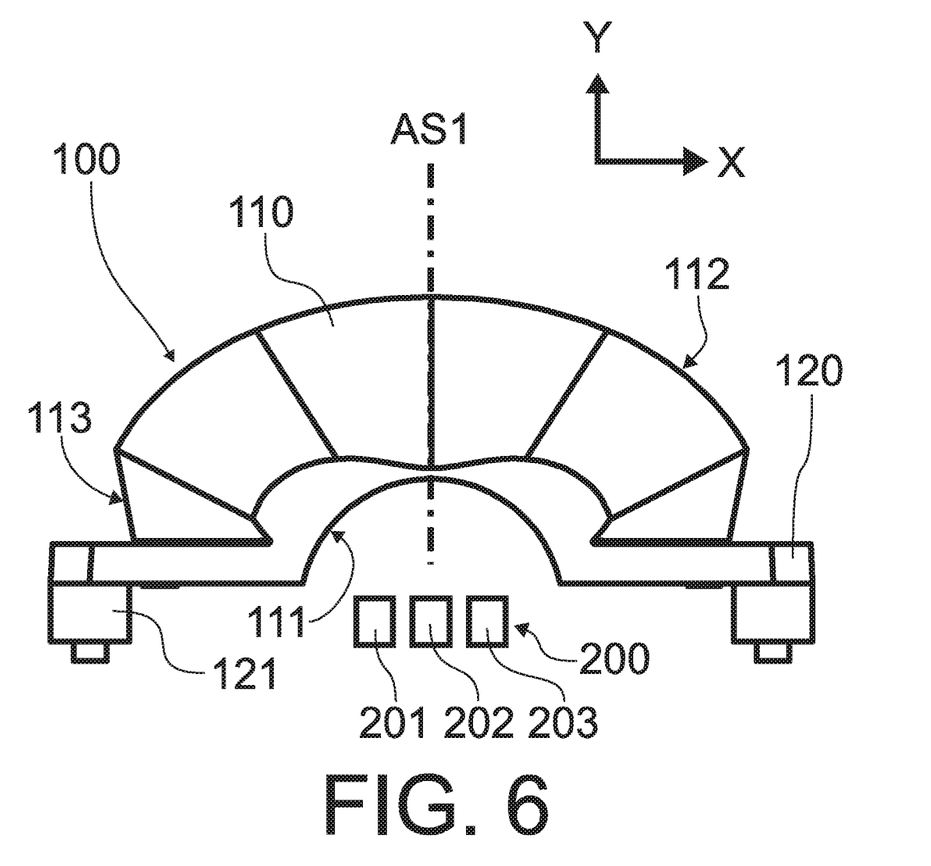
FIG. 6 illustrates a side elevation view of a modified lens in accordance with at least some embodiments featuring negative draft.

FIG. 6 shows a side elevation view of a modified version of the lens 100 shown in FIG. 2. As may be seen, the periphery 113 of the optical outlet surface 112 exhibits less draft than the embodiment of FIG. 5. The embodiment of FIG. 6 exhibits a negative draft of 11 degrees in respect to the second dimension Y. While the embodiment of FIG. 6 is foreseen, a positive draft, such as that shown in FIG. 2, is preferred for manufacturing purposes.

Figure 9:
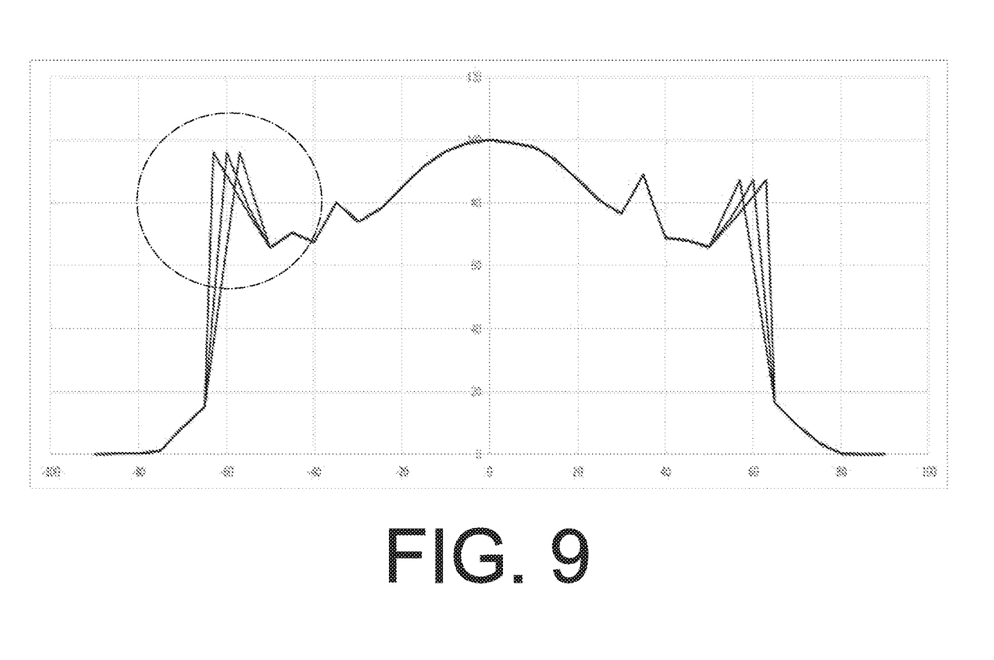
FIG. 9 illustrates a diagram of a light output pattern achieved with a lens according to FIG. 1.

The draft of the periphery 113, be it negative or positive, provides the effect that light rays emitted to the extreme of the optical portion 110 will be reflected, which may be utilized to enhance output at the extreme of the light pattern, particularly at 60 degrees. The phenomenon is illustrated in FIG. 9 which shows the output light pattern achieved with the lens 100 described above. FIG. 9 shows the light intensity as a function of radiation angle in the horizontal. As can be seen, the light pattern extends across an angular range of approximately 120 degrees. The light reflected off the periphery 113 of the optical portion 110 of the lens may be seen as a peak at approximately 60 degrees rather symmetrically in respect to zero angle. The area is highlighted in FIG. 9 with a dashed circle. FIG. 9 shows three different peaks that represent three different draft angles used in experimentation. The benefit is particularly useful for mitigating the effect of a planar transparent cover over the lens. As the lenses may be arranged in a planar setup, also the cover may be planar. Such a cover, despite being made of optically effective material, may due to the angle of the light source, decrease the output of the light source above approximately 45 degrees, particularly at approximately 60 degrees. With the drafted periphery, the lens 100 is able to counteract the dip caused by the cover.

The lens 100 as described in connection with any of the embodiments is exemplarily constructed to produce a light pattern which extends across 120 degrees or more in one dimension. The light pattern may be expressed in FWHM or it may be a square wave pattern. In another dimension, the light pattern exemplarily only extends across 10 degrees or less, more particularly five degrees or less, e.g. three degrees or less, such as 2.7 degrees. Such a flat oval light pattern is very desirable in obstruction illuminator applications. In the context of FIGS. 1 to 5, the light pattern is wide in the plane formed by the first and second dimension X, Y, e.g. the horizontal, and narrow in the plane formed by the second and third dimension Y, Z, e.g. the vertical.

According to another embodiment the lens is constructed to produce a light pattern which extends across 90 or more but less than 120 degrees in the dimension exhibiting the widest angular coverage. Such a lens may be used for augmenting the output of an illuminator pursuing a total light pattern produced with several lenses producing 120 degrees or more. The augmenting lens may take the form of a Fresnel lens.

Figure 7:
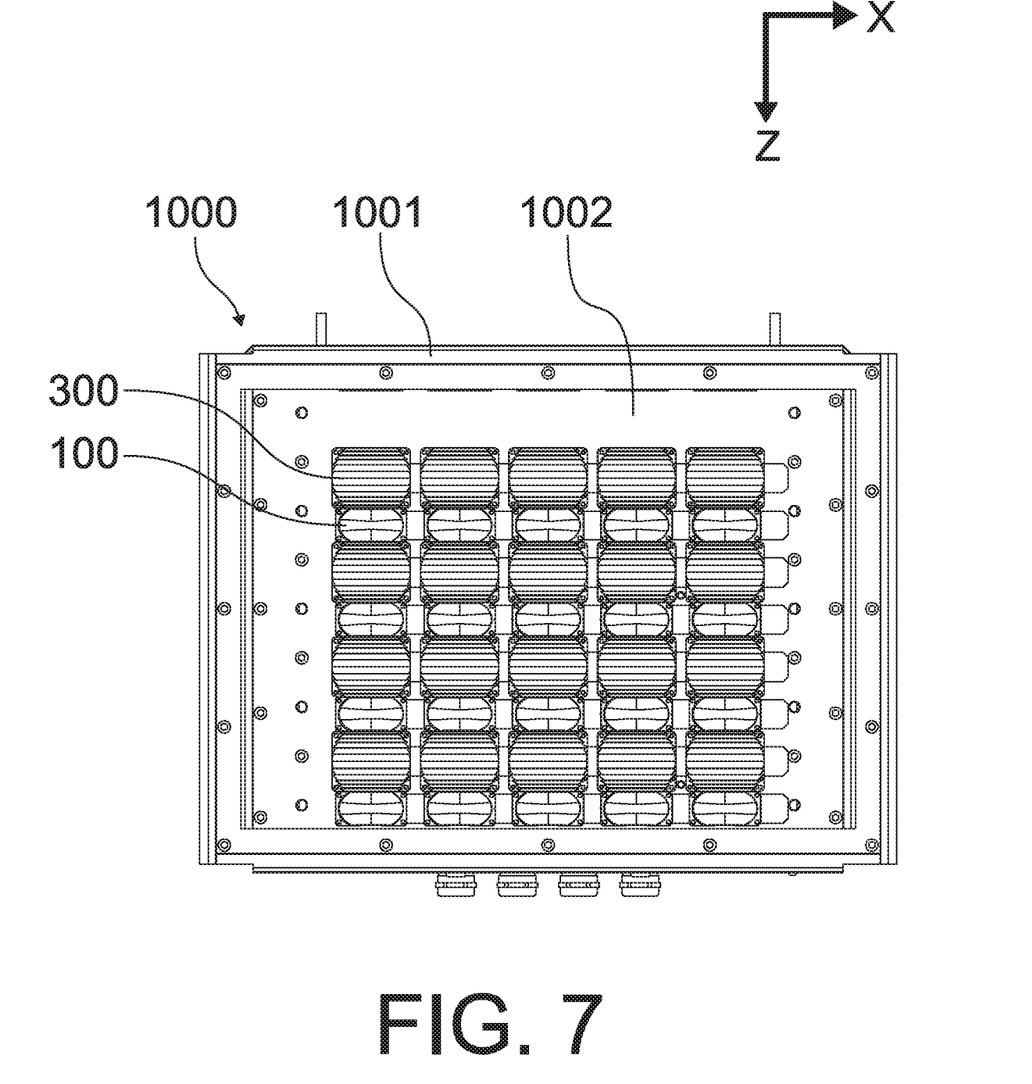
FIG. 7 illustrates a front plan view of an illuminator featuring lenses of FIG. 1.
Figure 8:
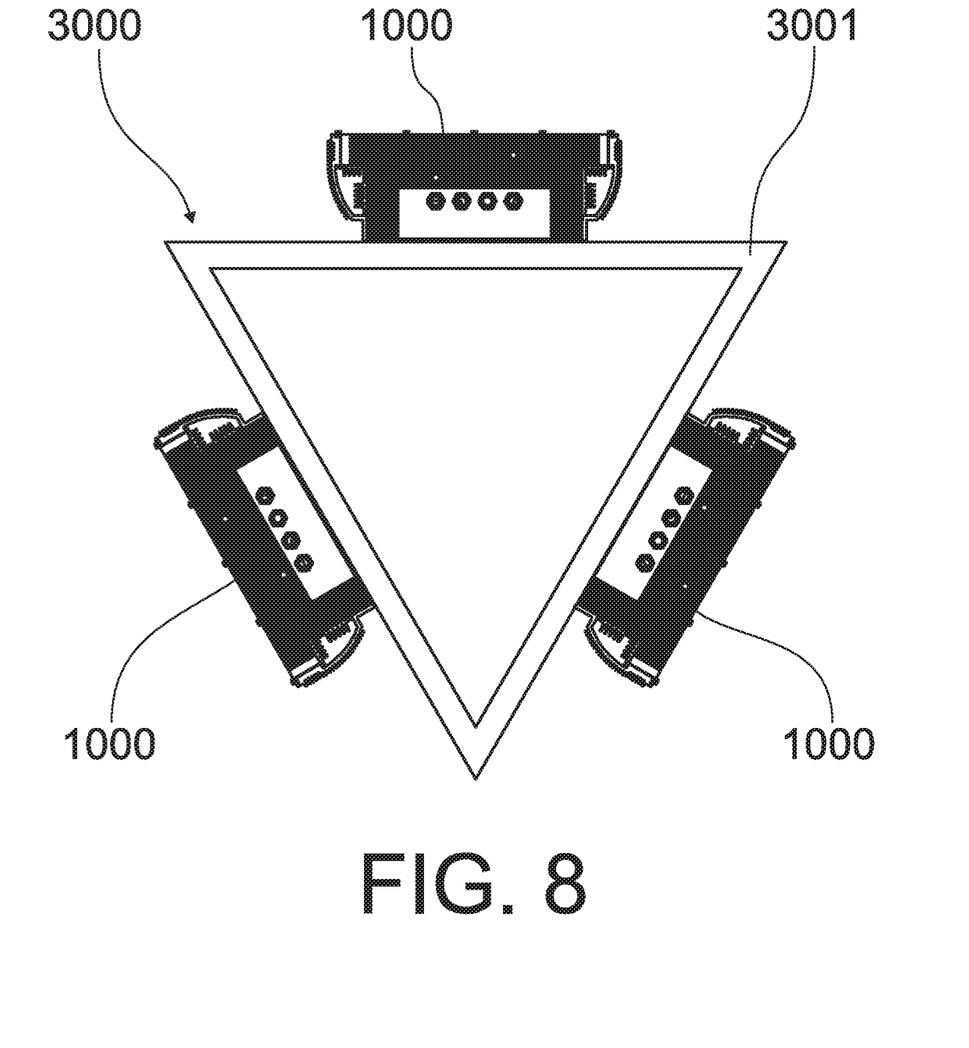
FIG. 8 illustrates a top elevation view of an omnidirectional illuminating system featuring three illuminators of FIG. 7.

Let us now turn to FIGS. 7 and 8, which show an illuminator provided with a plurality of lenses 100 according to the embodiment of FIGS. 1 to 4. FIG. 7 shows an illuminator 1000 in plan view along the second dimension. The illuminator 1000, when installed, is configured to produce a horizontal light pattern. The perspective of FIG. 7 is horizontal. The illuminator 1000 has a frame 1001 which houses a mounting plate 1002. The mounting plate 1002 supports a plurality of primary illuminating units, which may feature lenses 100 described above with reference to FIGS. 1 to 4, and optionally secondary illuminating units, which feature augmenting lenses 300. The augmenting lenses 300 are Fresnel lenses that are able to produce a relatively narrow light pattern but with good efficiency. The exemplary illuminator 1000 has 20 primary illuminating units arranged in a five by four matrix pattern and 20 augmenting lenses arranged in a five by four matrix pattern that is mixed with that of the primary illuminating units. The illuminating units are installed in the same plane on the mounting plate 1002. Such planar installation facilitates manufacturing and optics design. Also, compared to traditional V- or C-shaped mounting plates, the planar installation is able to effectively exploit the light output of the light emitting elements. A practical application of such an illuminator could be a high intensity aviation illuminator for tall structures, such as buildings, bridges, etc. In this context high intensity means an output of 100 000 effective candela or more.

Figure 10:
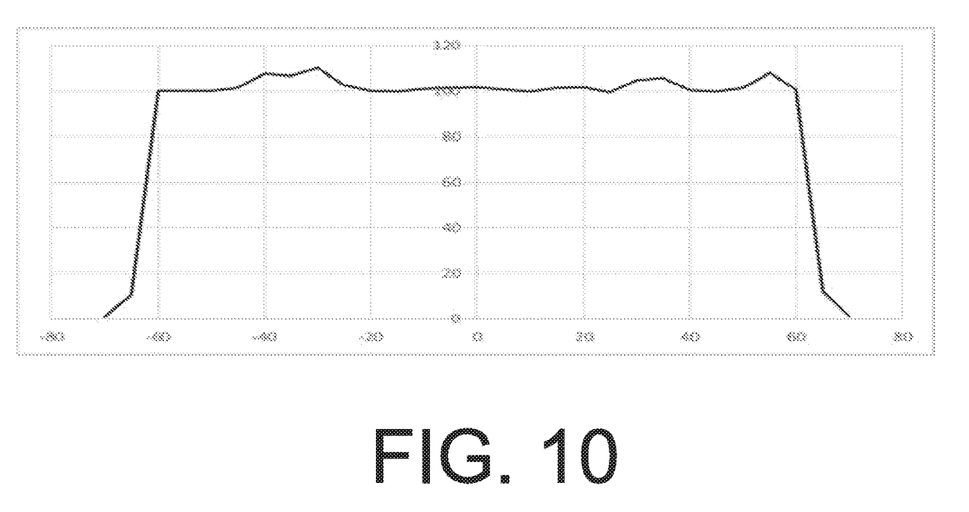
FIG. 10 illustrates a diagram of a light output pattern achieved with an illuminator of FIG. 7.

FIG. 10 shows the output light pattern achieved with the illuminator 1000 described above. FIG. 10 shows the light intensity as a function of radiation angle in the horizontal. As can be seen, the light pattern extends across an angular range of approximately 120 degrees. Compared to the output of an individual lens 100, it may be seen that the augmenting lenses 300 supplement the light output between the pronounced extremes at approximately 60 degrees and at the region of zero angle to achieve a relatively even pattern across the angular coverage in the horizontal.

FIG. 8 shows the illuminator 1000 of FIG. 7 being applied to form an omnidirectional illuminating system 3000. FIG. 8 shows the omnidirectional illuminating system 3000 in top elevation view, wherein the plane of the FIG. 1s horizontal. The omnidirectional illuminating system 3000 features a triangular frame 3001 with three illuminators 1000 mounted to each face. As each of the three covers 120 degrees, the summed output of the omnidirectional illuminating system 3000 is 360 degrees in the horizontal. The mounting plates 1002 of the three illuminators 1000 are successively turned by 60 degrees to each other. That way the illuminators 1000 are arranged at supplementing angles in respect to each other, whereby the angular coverage of the light output of the illuminators 1000 covers 360 degrees in the horizontal. Simultaneously, the produced light pattern extends across a relatively small angular coverage in the vertical. The vertical angular coverage of the light output may be 10 degrees or less, more particularly five degrees or less, such as three degrees or less.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

REFERENCE SIGNS LIST

| No. | Feature |
| --- | --- |
| 100 | lens |
| 110 | optical portion |
| 111 | first optical surface, optical inlet surface |
| 112 | second optical surface, optical outlet surface |
| 113 | periphery |
| 120 | mounting portion |
| 121 | foot |
| 130 | side surface |
| 200 | light source |
| 201 | light emitting element |
| 202 | light emitting element |
| 203 | light emitting element |
| 300 | augmenting lens |
| 1000 | illuminator |
| 1001 | frame |
| 1002 | mounting plate |
| 3000 | omnidirectional illuminating system |
| AS1 | first axis of symmetry |
| AS2 | second axis of symmetry |
| AS3 | third axis of symmetry |
| AS4 | fourth axis of symmetry |
| t1 | thickness |
| t2 | thickness |
| t3 | thickness |
| t4 | thickness |
| X | first Cartesian dimension |
| Y | second Cartesian dimension |
| Z | third Cartesian dimension |

The invention claimed is:

1. An obstruction illuminator or an aviation illuminator comprising:
   at least one artificial light source which comprises a plurality of light emitting elements, and
   a lens, the lens having an optical portion which:
      comprises a first optical surface and a second optical surface defining a thickness there between,
      has a length in a first dimension, has a height in a second dimension orthogonal to the first dimension, has a depth in a third dimension orthogonal to the first dimension and the second dimension, and which covers the plurality of light emitting elements of the at least one artificial light source, wherein:

the thickness of the optical portion is non-uniform along the first dimension and along the third dimension, the first optical surface is concave, when viewed in the second dimension from the point of view of the at least one artificial light source, the first optical surface is cylindrical with the cylinder axis extending in the third dimension, the lens is constructed to produce a light pattern of at least 120 degrees in the first dimension and not more than 10 degrees in the third dimension, and wherein all of the light emitting elements in the plurality of light emitting elements being covered by the lens are arranged only along the first dimension.

2. The illuminator according to claim 1, wherein the optical portion has a generally semi-annular shape when viewed in the third dimension.

3. The illuminator according to claim 1, wherein the second optical surface is curved with a non-uniform radius.

4. The illuminator according to claim 1, wherein:

the lens has a first axis of symmetry, which extends in the second dimension at the center point of the optical portion in the first dimension, and wherein:

the thickness of the optical portion increases as a function of deviation from the first axis of symmetry along the first dimension.

5. The illuminator according to claim 1, wherein:

the lens has a first axis of symmetry which extends in the second dimension at the center point of the optical portion in the first dimension, and wherein the thickness of the optical portion decreases as a function of deviation from the first axis of symmetry along the third dimension.

6. The illuminator according to claim 1, wherein the optical portion has a periphery at the extremes along the first dimension, which periphery comprises a negative draft.

7. The illuminator according to claim 1, wherein the optical portion has a periphery at the extremes along the first dimension, which periphery comprises a positive draft.

8. A system comprising a plurality of illuminators according to claim 1, wherein the lenses are arranged in a single plane.

9. An omnidirectional illuminating system, comprising three illuminators as defined by claim 1 arranged at supplementing angles in respect to each other such that angular coverage of the light output of the illuminators covers 360 degrees in the first dimension.

10. The illuminator according to claim 1, further comprising—at least one augmenting lens configured to produce a light pattern which extends across 90 degrees or more but less than 120 degrees in the first dimension.

11. The illuminator according to claim 10, wherein the augmenting lens is a Fresnel lens.

12. The illuminator according to claim 1, wherein the optical portion is semi-toroidal.

13. An omnidirectional illuminating system, comprising three illuminators as defined by claim 12 arranged at supplementing angles in respect to each other such that angular coverage of the light output of the illuminators covers 360 degrees in the first dimension.

14. The illuminator according to claim 12, further comprising—at least one augmenting lens configured to produce a light pattern which extends across 90 degrees or more but less than 120 degrees in the first dimension.

* * * * *